Nov. 27, 1923. 1,475,781

D. W. BATTERMAN

MOTOR VEHICLE

Filed Sept. 13, 1922  3 Sheets-Sheet 1

David W. Batterman.
INVENTOR

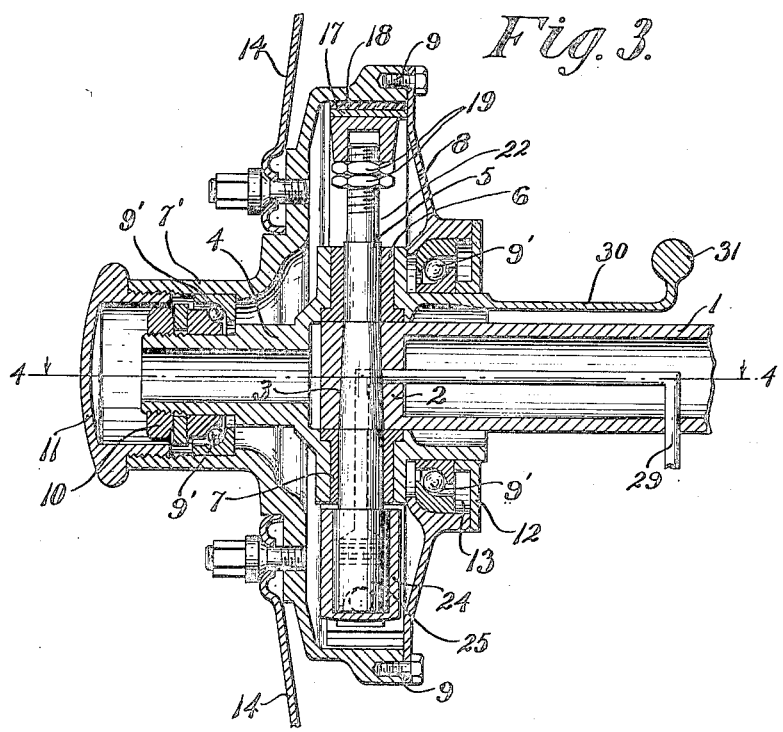
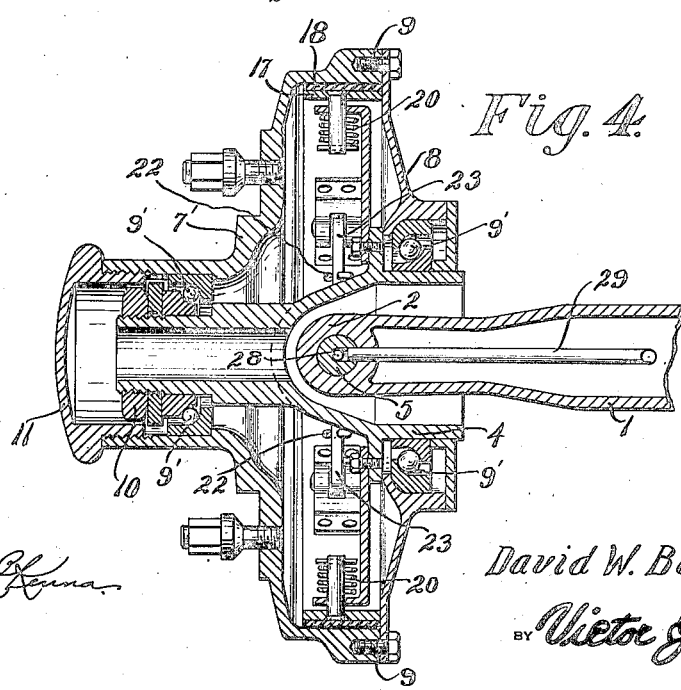

Nov. 27, 1923.                             1,475,781
D. W. BATTERMAN
MOTOR VEHICLE
Filed Sept. 13, 1922     3 Sheets-Sheet 3

David W. Batterman.
INVENTOR
BY Victor J. Evans
ATTORNEY

WITNESS:

Patented Nov. 27, 1923.

1,475,781

UNITED STATES PATENT OFFICE.

DAVID W. BATTERMAN, OF BIRD IN HAND, PENNSYLVANIA.

MOTOR VEHICLE.

Application filed September 13, 1922. Serial No. 588,041.

*To all whom it may concern:*

Be it known that I, DAVID W. BATTERMAN, a citizen of the United States, residing at Bird in Hand, in the county of Lancaster and State of Pennsylvania, have invented new and useful Improvements in Motor Vehicles, of which the following is a specification.

This invention relates to improvements in motor vehicles, the general object of the invention being to provide a floating front axle for the vehicle.

Another object of the invention is to provide braking mechanism for the front wheels which is entirely enclosed within the hub of each wheel.

A still further object of the invention is to pivot the spindle body on a perpendicular axis which is in the same plane as the center line of the tread part of the tire, thus insuring easy steering of the vehicle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a vertical longitudinal sectional view.

Figure 4 is a section on line 4—4 of Figure 3.

Figure 1:
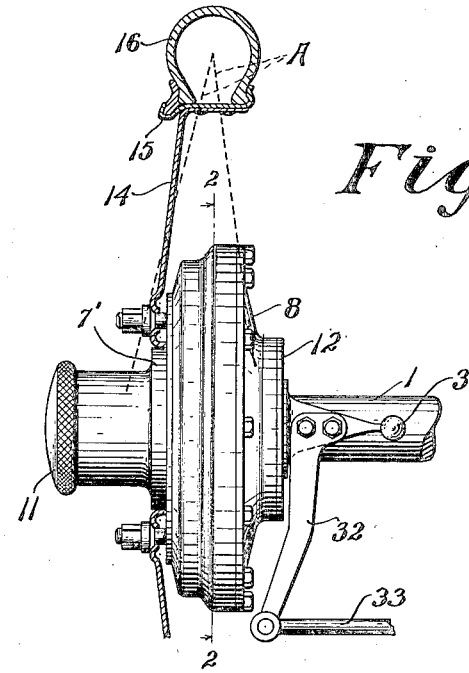
Figure 1 is a top plan view of the parts at one end of the front axle of a vehicle, parts being broken away.
Figure 2:
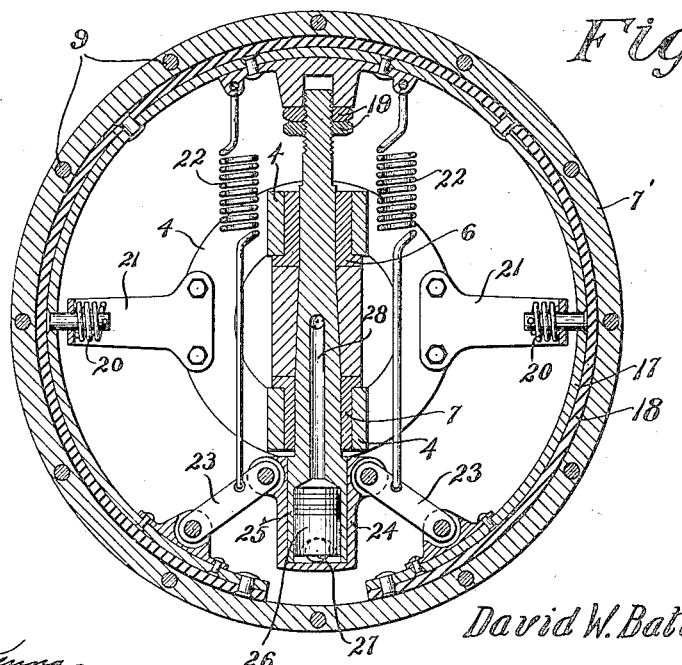
Figure 2 is a section on line 2—2 of Figure 1.
Figure 5:
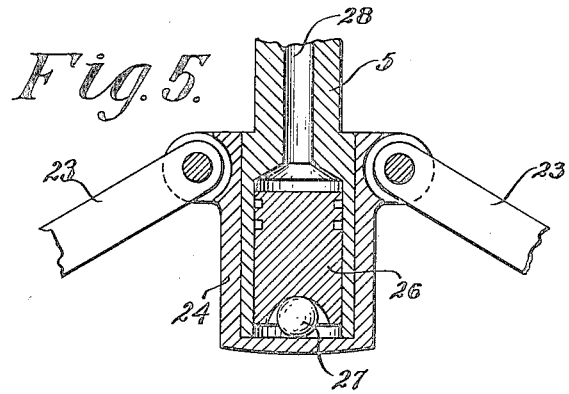
Figure 5 is an enlarged sectional view through the lower end of the spindle bolt, showing the brake operating means.
Figure 6:
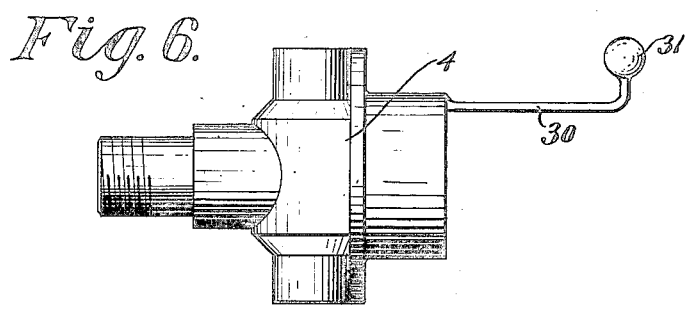
Figure 6 is an enlarged elevation of the spindle body.
Figure 7:
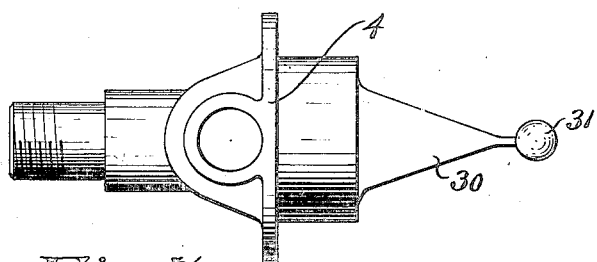
Figure 7 is a plan view thereof.

In these views 1 indicates the front axle which is of tubular construction and which has a boss 2 at each end which is drilled with a tapered hole 3. The spindle body 4 is pivotally connected with the axle by means of the bolt 5 which has a tapered part engaging the hole 3, the body being provided with the top bushing 6 and the lower bushing 7 for engaging the bolt, said body fitting over the end of the axle. The hub consists of the front part 7' and the rear part 8 which are connected together by the bolts 9, ball bearings 9' being placed at the front and rear between the hub and spindle body. The hub is held on the spindle by the nuts 10, the hub cap being shown at 11, and 12 indicates the rear spindle bearing nut which provides a space 13 for an oil retaining washer. A disc wheel 14 is bolted to the hub, said wheel carrying the demountable rim 15 for the tire 16. A brake band 17 with brake lining 18 is swiveled on the top of the bolt 5, nuts 19 being provided on said bolt for adjusting the band. The band is normally held retracted by the springs 20 carried by the brackets 21 which are secured to the spindle body and the springs 22 which are connected with the arms 23, pivotally connected with the brake band adjacent the ends thereof and with a cylinder 24 which is slidably mounted on a part 25 of the bolt 5. This part of the bolt is hollow and contains a piston 26 which engages a ball 27 located in the cylinder 24 and a passage 28 leads from the hollow part of the bolt and is connected by a flexible tubing 29 to a supply of compressed fluid. Thus by admitting some of this fluid to the hollow part of the bolt the piston will be depressed, thus forcing the cylinder downwardly and causing the arms 23 to expand the brake band against the action of the springs and thus press the lining against the hub and so check the rotation of the wheel. A steering arm 30 is connected with the spindle body, said arm terminating in a ball 31 to which the steering mechanism is connected. A spindle arm 32 is bolted to the steering arm and a tie rod 33 connects the spindle arm with a similar arm on the other wheel.

As will be seen the spindle body bolt is in the same plane with the center line of the tire and the dotted lines A starting on the center line of the tire and spindle body and terminating in the front and rear bearings indicate how nearly equal the weight of the vehicle is taken between the front and rear bearings, which is of the greatest importance.

This invention provides easy steering of the vehicle and gives a full floating effect to the front axle. It also provides a braking mechanism for the front wheels which is simple and effective in operation and is entirely enclosed within the housing.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with the front axle of a motor vehicle, a perpendicular bolt carried at one end thereof, a spindle body fitting over the end of the axle and having upper and lower bearings engaging the bolt, a wheel having its hub rotatably mounted on the body, a brake band within the hub and having its upper part resting upon the top of the bolt, a movable member on the bolt, means for connecting the movable member with the brake band and pressure means for moving said member to expand the band.

2. In combination with the front axle of a motor vehicle, a perpendicular bolt carried at one end thereof, a spindle body fitting over the end of the axle and having upper and lower bearings engaging the bolt, a wheel having its hub rotatably mounted on the body, a brake band within the hub and having its upper part resting upon the top of the bolt, a movable member on the bolt, means for connecting the movable member with the brake band, pressure means for moving said member to expand the band, such means consisting of a piston located in a hollow part of the bolt and means for introducing fluid under pressure into said hollow part for moving the piston to cause it to actuate the movable member into brake expanding position.

3. In combination with the front axle of a motor vehicle, a perpendicular bolt carried at one end thereof, a spindle body fitting over the end of the axle and having upper and lower bearings engaging the bolt, a wheel having its hub rotatably mounted on the body, a brake band within the hub and having its upper part resting upon the upper end of the bolt, the lower end of the bolt being hollow, a piston in said hollow part, means for introducing fluid under pressure into said hollow part for moving the piston outwardly, a cylindrical part slidably mounted on the lower end of the bolt and adapted to be actuated by the moving piston, links connecting said cylindrical part with the brake band and spring means for normally holding the band contracted.

In testimony whereof I affix my signature.

DAVID W. BATTERMAN.